Aug. 7, 1951

J. FISHER 2,563,522

ARTIFICIAL FISH BAIT

Filed March 30, 1949

INVENTOR.
Jesse Fisher,
BY
Mason, Kolehmainen, Rathburn & Wyss
Attys.

Patented Aug. 7, 1951

2,563,522

UNITED STATES PATENT OFFICE 2,563,522

ARTIFICIAL FISH BAIT

Jesse Fisher, Medford, Wis., assignor to Glo-Lure, Inc., Medford, Wis., a corporation of Wisconsin Application March 30, 1949, Serial No. 84,371

2 Claims. (Cl. 43—42.24)

The present invention relates to fishing tackle and has for its primary object the provision of a new and improved artificial fish bait.

Another object of the present invention is to provide a new and improved fish bait which can be made readily and economically, can be easily applied to a hook, can be made to simulate a worm in very lifelike manner, is luminous, is quite certain to stay on a hook once it is placed thereon, and will retain a fish-attracting scent for a long period of time.

The artificial bait of the present invention includes a flexible body and a deformable support for the body having a covering of fibrous material and which can be bent to various positions to hold the body in those positions. For example, the bait can be wound around or otherwise placed on a fish hook with assurance that it will stay on. The support for the body may take various forms but it is preferred that the support be a pipe cleaner-like element. A pipe cleaner has just about the right flexibility, it can be bent and wound around a hook easily, will stay in the position to which it is bent, and is impregnable by the body material and will thus effectively hold the body. The body itself preferably is a rubberlike plastic, which can be luminous and scented and which is infused into the fibrous material of the pipe cleaner. The pipe cleaner can be colored and the body applied to it so that the coloring is slightly discernible, thereby to make the bait even more lifelike.

Other objects and advantages of the present invention will become apparent from the ensuing description of an illustrative embodiment thereof, in the course of which reference is had to the accompanying drawing, in which.

Figure 1:
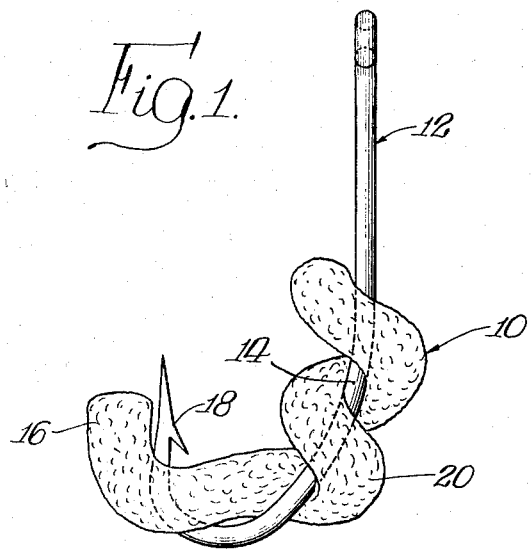
Fig. 1 is an elevational view of the bait of the present invention applied to a fish hook.

Referring now to the drawing and first to Fig. 1 it may be noted that the artificial bait 10 of the present invention is shown applied to a fish hook 12. A number of convolutions are wound about the shank 14 and the end 16 is bent so that it is quite close to the barb 18 of the hook. However, the bait can be otherwise mounted upon or secured to the hook and it can be made or cut to the desired length for a particular application.

Figure 2:
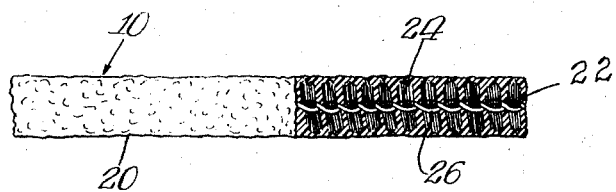
Fig. 2 is an elevational view of the bait prior to application to a fish hook, the bait being shown partly in section.
Figure 3:
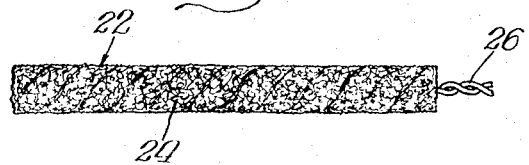
Fig. 3 is an elevational view of a short length of the deformable body supporting structure, which may be in the nature of a pipe cleaner.

The bait simulates an earthworm, as can be seen in Fig. 1, as well as Fig. 2 in which the bait is shown as it appears prior to application. The bait comprises a flexible body 20 and a deformable support 22. The latter may take various forms but it is preferred, for a number of reasons which will be made apparent hereafter, that it be a pipe cleaner or something resembling such. As illustrated, it is a pipe cleaner of conventional construction including an impregnable fibrous material 24, such as cotton chenille, secured to a twisted wire carrier 26 and substantially surrounding the latter.

The body 20 is a material that is infusible into the fibrous material 24 of the support, as best illustrated in Fig. 2 so that the pipe cleaner constitutes an internal support for the body. The material shown is a flexible rubberlike plastic adapted when in a liquid state quite thoroughly to impregnate the fibrous material of the support. A light coating substantially surrounding the fibrous material can be applied so as substantially to hide the support, although it is preferred that some of the coloring of the cleaner show through. For example if a red or pinkish cleaner is used, some of the color shows through to give the bait the appearance of a live worm. This appearance is enhanced because the use of a pipe cleaner and a thin surrounding covering of the plastic results in a somewhat roughened exterior.

The plastic material of the body is preferably also luminous and scented so as to make it a more appealing bait.

In manufacture of the bait, the pipe cleaners, which can be specially made if desired, are cut to desired lengths and the ends bent to facilitate hanging on oven racks. The cleaners are then immersed in the plastic, which is in a liquid state at this stage, so as to infuse the plastic in and to cover the fibrous material of the cleaners. After the dipping operation, the cleaners are hung on racks and dried briefly in an oven, as for three minutes at a temperature of about 410° F., after which they are cooled. The cooled products, which are now the bait, may be scented as by spraying with or dipping into a fish attracting scent.

The plastic may be a luminous rubber material compounded of powdered polyvinyl chloride-acetate resin, dioctyl phthalate, phosphorescent pigment and a stabilizing agent to prevent scorching. The scenting material may be one having as a base the same plasticizer, i. e., dioctyl phthalate, that is used in making the body, It serves not only to scent the bait but also to increase its flexibility.

The bait may be manufactured in desired lengths such as short lengths intended for use with different size and type hooks, or it may be made in longer lengths and cut to desired lengths either at the factory or by the fisherman. The bait can be easily wound on the hook and the pipe cleaner body support is sufficiently rigid to hold the bait in the position in which it is wound. The bait thus retains its intended appearance and, also, will not fall off the hook.

The bait simulates very closely a live earthworm. The colored fibrous material gives it a desired cast and the texture of the fibre gives the outer surface a somewhat uneven skinlike appearance making the bait even more lifelike. The bait can also be made luminous by exposing it to sunlight or other strong light for a few minutes.

While the present invention has been described in connection with the details of an illustrative embodiment, it should be understood that these details are not intended to be limitative of the invention except as set forth in the accompanying claims.

Having thus described my invention, what I claim as new and desire to secure by United States Letters Patent is:

1. An artificial bait including elongated supporting structure comprising a deformable element adapted to hold the body in various positions to which the element is bent and an impregnable fibrous material substantially surrounding said element, and a flexible rubberlike body defining portion infused into and substantially surrounding said material.

2. An artificial bait adapted to be wound around or otherwise to be secured and supported upon a fish hook including a pipe cleanerlike support of deformable element type covered with fibrous material and a worm simulating luminous and scented plastic infused into said support.

JESSE FISHER.

REFERENCES CITED

The following references are of record in the file of this patent:

UNITED STATES PATENTS

| Number | Name | Date |
|---|---|---|
| 79,446 | Christian | June 30, 1868 |
| 284,056 | Pflueger | Aug. 28, 1883 |
| 1,010,481 | Crane et al. | Dec. 5, 1911 |
| 1,777,004 | Lemere et al. | Sept. 30, 1930 |
| 1,792,366 | Ettles | Feb. 10, 1931 |
| 1,922,841 | Cooley | Aug. 15, 1933 |
| 2,102,739 | Peters | Dec. 21, 1937 |
| 2,189,556 | Younghusband | Feb. 6, 1940 |
| 2,254,235 | Mutch | Sept. 2, 1941 |
| 2,441,232 | Bakken | May 11, 1948 |
| 2,517,740 | Uldbjerg | Aug. 8, 1950 |
| 2,521,616 | Weber | Sept. 5, 1950 |